United States Patent [19]
Ota et al.

[11] Patent Number: 6,018,613
[45] Date of Patent: Jan. 25, 2000

[54] DISC PLAYER THAT REINITIALIZES WHEN A DISC IS EJECTED

[75] Inventors: Kiyoshi Ota, Tokyo; Kousuke Misono; Toshiyuki Ishii, both of Kanagawa, all of Japan

[73] Assignee: Sony Corporation, Tokyo, Japan

[21] Appl. No.: 08/245,954

[22] Filed: May 18, 1994

Related U.S. Application Data

[62] Division of application No. 07/950,941, Sep. 24, 1992, Pat. No. 5,331,423.

[30] Foreign Application Priority Data

Sep. 30, 1991 [JP] Japan ................................ 3-278805

[51] Int. Cl.$^7$ .................................................. H04N 5/781
[52] U.S. Cl. ........................................ 386/106; 386/125
[58] Field of Search .................................. 358/342, 341, 358/343, 335, 310, 322; 360/19.1, 99.02, 99.03, 99.04, 99.06, 99.07, 99.08; 369/31, 32, 33, 47, 48, 58; 386/106, 125; H04N 5/76, 5/78, 5/781, 5/782, 5/783, 5/92, 9/79, 5/91

[56] References Cited

U.S. PATENT DOCUMENTS

| 4,800,453 | 1/1989 | Okouchi et al. ............... 360/99.02 |
| 4,914,523 | 4/1990 | Maruta ............................ 358/310 |
| 4,979,048 | 12/1990 | Shimada et al. ............... 358/342 |
| 5,060,220 | 10/1991 | Lee ................................. 369/58 |
| 5,177,728 | 1/1993 | Otsubo et al. .................. 369/48 |

OTHER PUBLICATIONS

Patent Abstracts of Japan, vol. 14, No. 547 (P–1138), Dec. 5, 1990 & JP–A–02 232 862 (Pioneer Electronic Corporation), Sep. 14, 1990.

Patent Abstracts of Japan, vol. 12, No. 58 (P–669), Feb. 20, 1988 & JP–A–62 202 352 (Ricoh Co. Ltd), Sep. 7, 1987.

*Primary Examiner*—Thai Tran
*Attorney, Agent, or Firm*—Limbach & Limbach L.L.P.

[57] ABSTRACT

A disc player, which reproduces information recorded on a disc, reinitializes the signal processing circuitry of the disc player when a disc is ejected from the player. As a result, the need for an exterior reset switch, which must be pressed to reinitialize the signal processing circuitry, can be eliminated.

10 Claims, 4 Drawing Sheets

DISC PLAYER THAT REINITIALIZES WHEN A DISC IS EJECTED

This is a divisional of application Ser. No. 07/950,941, filed Sep. 24, 1992.

FIELD OF THE INVENTION

The present invention relates to a disc player and, in particular, to a CD player that automatically initializes the player in response to a disc being ejected.

DESCRIPTION OF THE RELATED ART

With conventional compact discs (CD), one type of disc which is adapted to record video data in addition to audio data is known as a CD-I disc.

Specifically, video data, text data, program data, and audio data can be recorded on the CD-I disc and accordingly, by reproducing the video data and the audio data in interactive style, a CD-I player can be used in many fields, such as the educational and amusement fields.

Generally, a disc player which plays CD-I discs is reset to an initial state when a power switch is turned on, and thereafter executes sequentially the processing steps according to the subject of the CD-I disc and thus the video data and audio data, etc. will be processed according to the prescribed step.

Furthermore, when the CD-I disc is removed during the reproducing process, the last displayed image remains and the sound is jammed. A reset switch is typically used to manually reset the CD-I player to the initial state so that, the processing steps can be again sequentially executed according to the contents of the new CD-I disc.

However, if the manual operation of the reset switch can be omitted, the operation of the reset switch can be simplified, thereby making the operation of the CD-I player more convenient.

SUMMARY OF THE INVENTION

In view of the foregoing, an object of this invention is to provide a disc player which is capable of operating without manually operating a reset switch.

The foregoing object and other objects of the invention have been achieved by a disc player that reproduces information recorded on a disc. The disc player in accordance with the present invention includes disc ejecting means that eject the disc from the disc player, drive means that rotate the disc, and disc drive control means that stop the rotation of the disc via the drive means in response to the disc ejecting means.

The disc player of the present invention also includes signal processing means and reset means. The signal processing means process the audio information and the image information reproduced from the disc. The reset means initializes the signal processing means in response to the disc ejecting means when a disc is ejected by the disc ejecting means.

The nature, principle and utility of the invention will become more apparent from the following detailed description when read in conjunction with the accompanying drawings in which like parts are designated by like reference numerals or characters.

DETAILED DESCRIPTION OF THE INVENTION

Preferred embodiments of this invention will be described with reference to the accompanying drawings.

The Exterior Construction.

Figure 1:
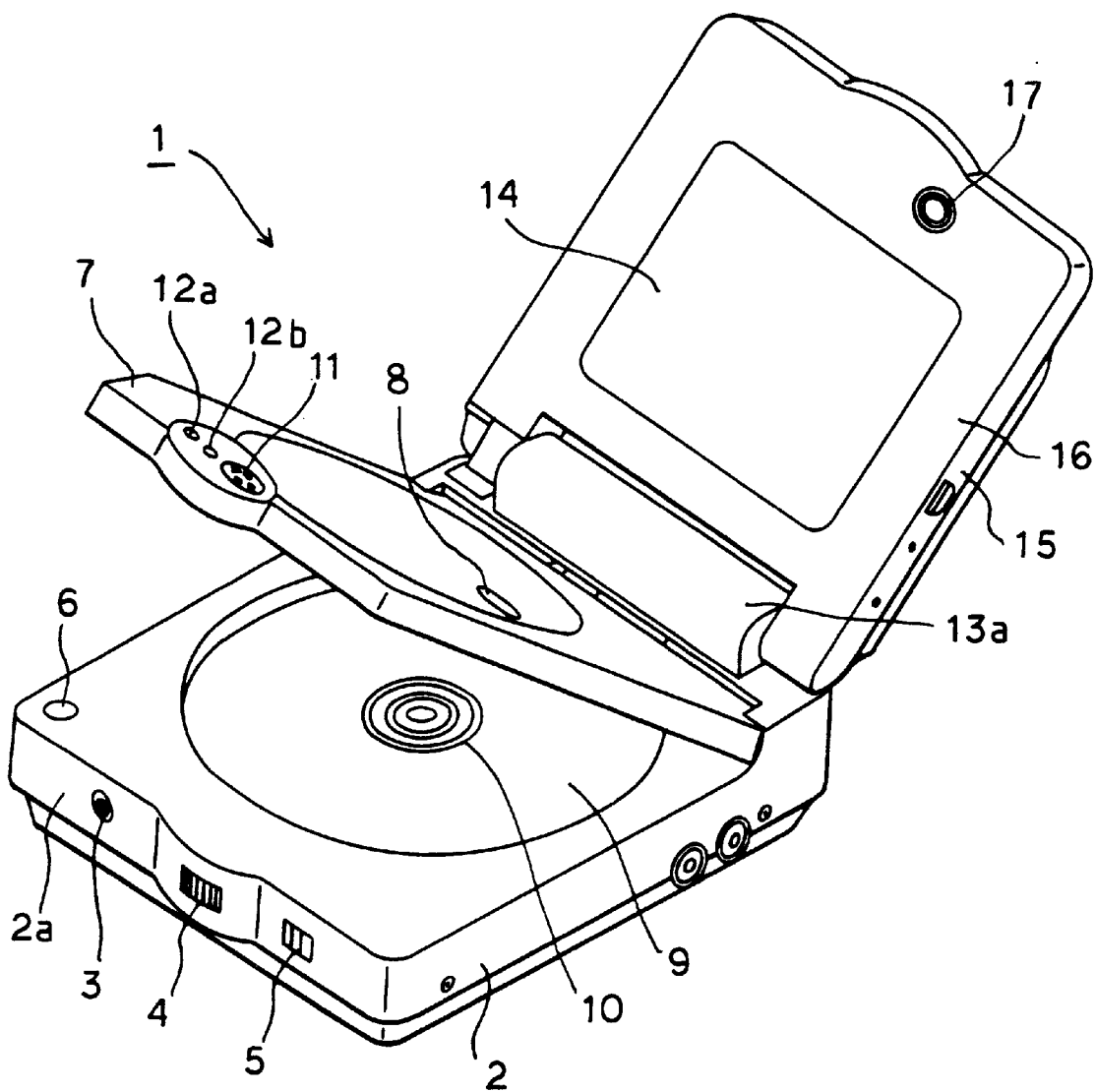
FIG. 1 is a perspective diagram showing an exterior view construction of a disc player according to one embodiment of the present invention.

Designated as reference numeral 1, in FIG. 1, is a portable type disc player, which is adapted to reproduce the ordinary audio compact discs in addition to the CD-I discs.

More specifically, in the disc player 1, after loading a disc into a reproducing position on a player 2, the disc can be set in the reproducing position by closing the inside cover 7.

In the player 2 includes a disc driving unit that rotates the loaded disc, an optical driving unit that drives the optical head, a signal processing circuit that processes the reproducing signal a round concave unit 9 that supports a loaded disc and a turntable 10 which is located at a central portion of the player 2.

Furthermore, in the player 2, an earphone jack 3 for deriving reproduced audio signal, a dial 4 for sound volume adjusting, and a power switch 5 are arranged on the front edge 2a. An eject switch 6 is located on a top surface of the inside cover 7.

The inside cover 7 is hinged on the back edge of the player 2 and is arranged to cover substantially all of the top surface of the player 2, except for the eject switch 6. Thus, eject switch 6 can be reached with the inside cover 7 closed.

Thus, in the disc player 1, the reproduction of the disc can be stopped by pressing the eject switch 6 which allows the discs to be exchanged by opening the inside cover 7.

An oval window unit 8 is provided on the right side so that the reproducing process can be confirmed with the eye via said window unit 8 at the inside cover 7.

Furthermore, on the front edge of the inside cover 7, a X-Y device 11 and trigger buttons 12a, 12b are arranged. The prescribed coordinates can be determined by pressing the X-Y device, and simultaneously, the function mode can be changed by pressing the trigger buttons 12a and 12b.

The outside cover 15 is hinged on the back edge of the player proper 2 via an axis supporting unit 13a.

On the upper part of the inner side 16 of the outside cover 15, a display switch 17 is placed and the display of the display unit 14 can be on/off controlled by pressing the display switch 17.

Construction of the Circuits

Figure 2:
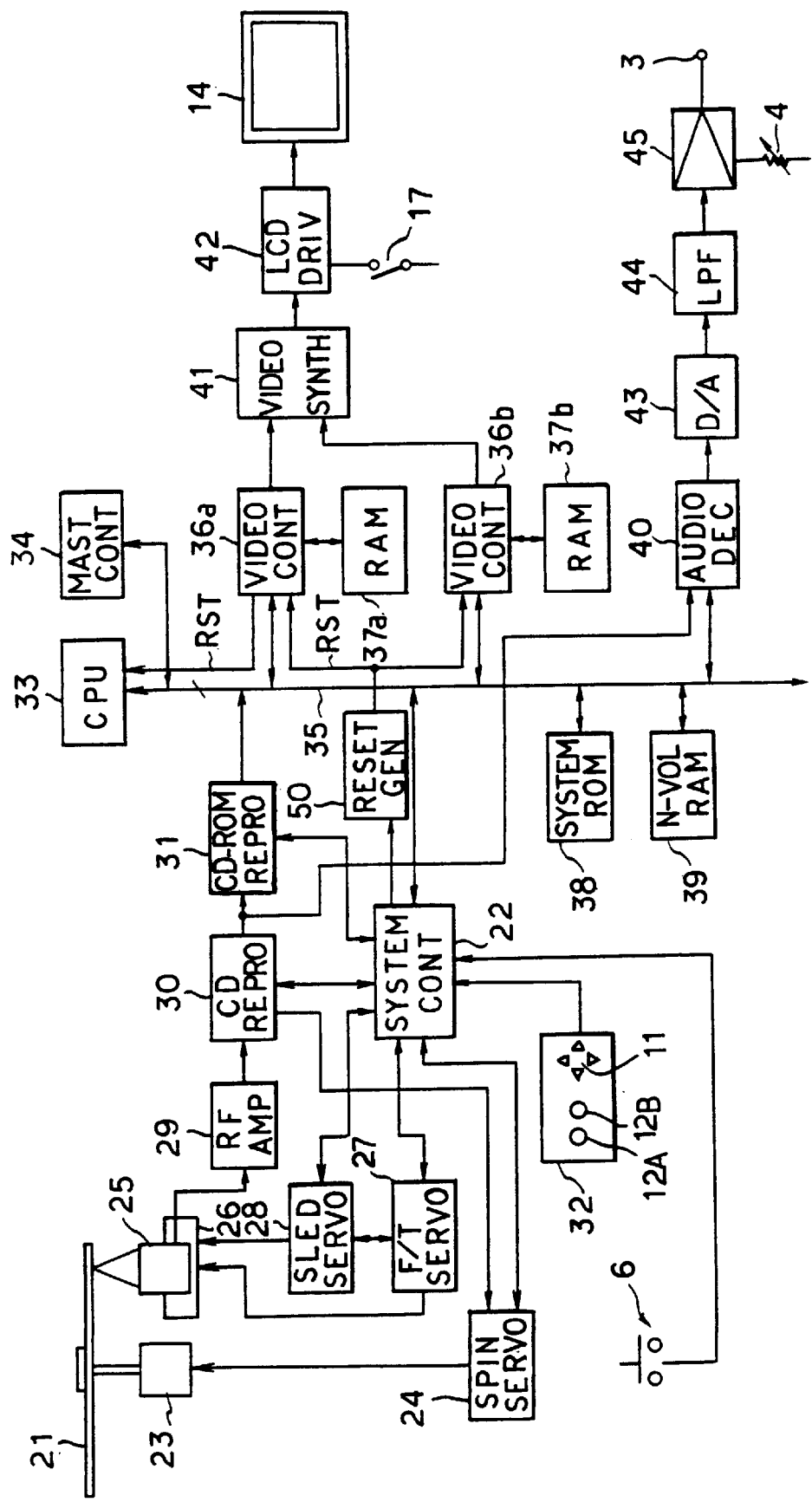
FIG. 2 is a block diagram showing its circuit construction.

As shown in FIG. 2, in the disc player 1, the disc 21 is rotated at a constant linear velocity (i.e., CLV) by driving the spindle motor 23 using the spindle servo circuit 24.

In the spindle servo circuit 24, the operation of the circuit will change depending upon the control data received from the system controller 22. Thus, if the eject switch 6 is pressed on, the disc 21 will stop its rotation.

The optical head 25 irradiates disc 21 with laser light from of semi-conductor laser, receives its reflected light with a light receiving device, and then provides an output signal which represents the light received by the light receiving device as a reproducing signal of the disc 21.

furthermore, the optical head 25 is supported by the a two-axis device, and in the disc player 1, the two axis device can be focusing servo-controlled and tracking servo-controlled by driving at the focus/tracking servo circuit 27.

Furthermore, the optical head 25 is maintained on a slide mechanism 26 which is driven by the output signal of a sled servo circuit 28 so that the reproducing signal can be derived from the desired recording track of the disc 21.

Further regarding the focus/tracking servo circuit 27 and the sled servo circuit 28, the function will be changed corresponding to the control data of the system controller 22 and, for example, if the eject switch 6 is turned on, the operation will be stopped.

The CD reproducing circuit 30 receives the reproducing signal of the optical head 25 via the RF amplifier 29 and extracts the reproducing clock from the reproducing signal.

Furthermore, the CD reproducing circuit 30, after EFM demodulating the reproducing signal referring to the reproducing clock, executes an error correction process and thereby outputs the resultant reproducing data to the CD-TOM reproducing circuit 31 and the audio decoder 40.

The CD-ROM reproducing circuit 31, after detecting the sync from the reproducing data, executes a descramble process depending upon the detected result thereof, and executes an error correction process as occasion demands.

More particularly, these types of discs include CD-ROM discs and CD-I discs in addition to the compact discs recorded with only audio signals.

The compact discs recorded with only audio signals are arranged to record the audio data sequentially with the prescribed format continued from the TOC (table of content) data in the lead-in area of the disc.

Accordingly, when these types of compact discs are reproduced, the audio data recorded on the compact disc can be reproduced by deriving the reproducing data to be obtained from the CD reproducing circuit 30 via the digital to analog converting circuit sequentially.

On the other hand, in the CD-ROM and CD-I discs, the user data are recorded in blocks following the TOC data in the lead-in area.

At this point, the user data of 98 frames are assigned to each block regarding the CD-ROM and CD-I discs, and the sync signal and the header data are added to the head of each block.

Further to the CD-ROM and CD-I discs, the user data are recorded in two kinds of format, i.e., the form 1 and the form 2, depending on whether there is any error correction process or not, and accordingly the format is selected and thus error correction capability can be improved.

More particularly, in the form 1, a 4 byte error detection code and a 172 byte error correction code are added to the user data of each block, and thus the user data of 2048 byte are recorded in each block.

On the other hand, in the form 2, the error detection code and the error correction code are omitted to enlarge the recording capacity of the user data, and the 2324 byte user data are recorded in each block.

Accordingly, in the CD-ROM reproducing circuit 31, with regards to the reproducing data of the form 2, only the descramble process is performed and supplied to the bus 35 while the error correction procedure is executed on the reproducing data of the form 1 and the resultant demodulation data is supplied to the bus 35.

Furthermore, in the CD reproducing circuit 30 and the CD-ROM reproducing circuit 31, the functions can be changed according to the control data of the system controller 22.

The video controllers 36a and 36b change functions corresponding to the control data obtained from the central processing unit (CPU) 33 via the bus 35, and process the video data obtained from the CD-ROM reproducing circuit 31 to the bus 35.

More specifically, in the CD-I disc, the video data are processed with a variable run-length encoding process, e.g., using the method of run-length Huffman encoding process, and the luminance signal and the color difference signal which are sampling processed with the prescribed sampling frequency, are recorded in the data compressed form.

According to this recording format, in the video controllers 36a and 36b, the video data are data expanded and converted to the video signals and supplied to the video synthesizer 41.

At this point, in the video controllers 36a and 36b, video signals are formed using the random access memory circuits (RAM) 37a and 37b, and thus the video data will be stored once, and then converted to the video signals as occasion demands.

Moreover, in the video controllers 36a and 36b, it is arranged to process the video data of the initial picture obtained via the bus 35 when the disc player 1 starts, and thus in the disc player 1, the initial picture according to the type of the disc 21 can be displayed at the time of starting.

The video synthesizer 41 changes the function according to the control data obtained from the CPU 33 and supplies the video signal obtained from the video controller 36a or 36b selectively or synthesized form.

The LCD (liquid crystal device) driving circuit 42 drives the display unit 14 depending on the video signal to be supplied from the video synthesizer 41, and thus displays the initial picture via the display unit 14 when the disc player 1 starts and after it started the function, the video data of the disc 21 can be displayed.

At this time, in the disc player 1, the video data can be confirmed easily with the decreased power consumption by constituting the display unit 14 using the liquid crystal device.

Furthermore, the LCD driving circuit 42 stops its function corresponding to the operation of the display switch 17 when the switch is pressed, and thus, the power consumption can be further decreased.

The audio decoder 40 changes its function corresponding to the control data to be supplied from the CPU 33 via the bus 35, and processed the audio data to be supplied from the CD-ROM reproducing circuit 31 to the bus 35.

More specifically, in the CD-ROM, audio CD, CD-I discs, the plural modes are standardized regarding the audio signals and the audio data are recorded by selecting the modes as occasion demands.

Here, the sampling frequency, the quantization bit length, and the encoding processing method, of the audio data differ in each mode respectively, and in the audio decoder 40, the audio data are converted to the digital audio signals by changing the function in accordance with the mode of the disc 21.

Thus, the audio decoder 40 converts the digital audio signal to the analog signal at the digital analog converter (D/A) 43 and then supplies via the low pass filter circuit (LPF) 44 and the amplifier 45.

On the other hand, in case of reproducing the ordinary compact disc, the audio decoder 40 stops its operation and the reproducing data obtained from the CD reproducing circuit 30 are supplied to the digital analog converter 43 directly.

More specifically, in the ordinary compact disc, the reproducing data of the CD reproducing circuit 30 will be supplied directly to the digital analog converter 43 and the audio signals can be reproduced easily.

The CPU 33 is controlled by the master controller 34 and sequentially executes the processing program stored in the system ROM 38.

In this event, after the disc player 1 starts the reproducing operation of the disc 21, the CPU 33 sequentially executes the processing procedures in accordance with the application of each disc.

Further, the bus 35 is connected with the non-volatile RAM 39.

Accordingly, the audio decoder 40 constitutes the audio data processing unit for processing the audio data of the optical disc 21 and the CPU 33 constitutes the control unit for controlling the audio data processing unit and the video data processing unit while the video controllers 36a and 36b constitute the video data processing unit for processing the video data of the optical disc 21.

Construction of the CPU

Figure 3:
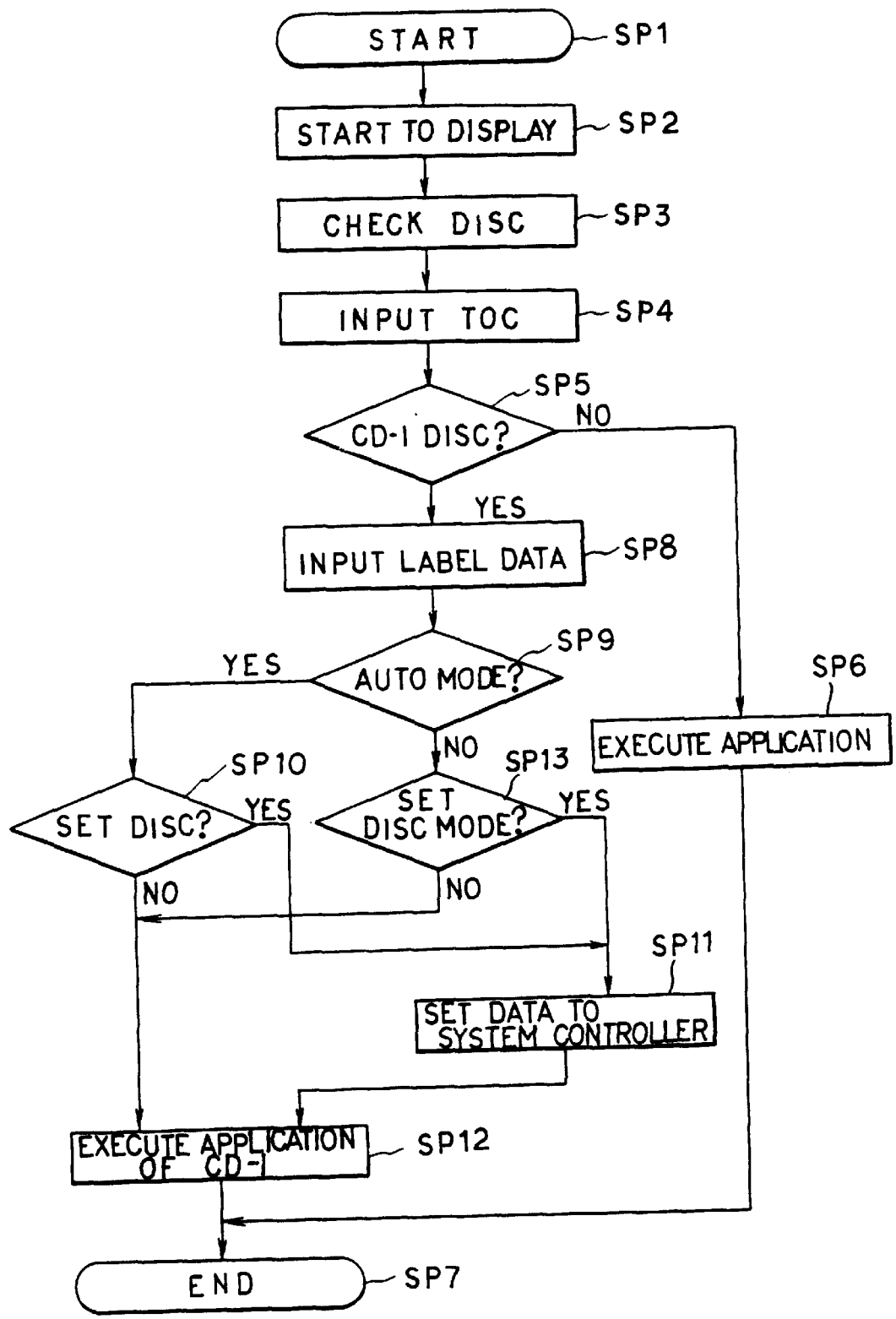
FIG. 3 is a flow chart showing the processing procedure of the CPU.

At this point, the CPU 33 executes the processing procedure as shown in FIG. 3 to process the data of the disc 21.

More particularly, the CPU 33 starts from step SP1 and goes to step SP2 when the power switch is on, and thereby displays the prescribed display screen on the display unit 14.

In this connection, the timer of the disc player 1 can be set and renewed in this embodiment utilizing the display screen.

The CPU 33 then moves to step SP3 and ascertains whether the disc 21 is loaded or not, and if the disc 21 is loaded, moves to step SP4 and reads out the TOC data from the disc 21.

Moreover, in the system controller 22, if the disc 21 is loaded and the operation switch for reproducing is turned ON, the spindle servo circuit 24 is driven. In the CPU 33, the TOC data are read out after the spindle servo circuit 24 comes to the steady condition.

When the TOC data are read out, the CPU 33 moves to step SP5 and examines whether the disc 21 is a CD-I disc or not.

More particularly, the TOC data includes identification data which shows the type of disc that disc 21 is. The CPU 33 determines the type of disc by examining this identification data.

At this point, if the negative result is obtained, the CPU 33 moves to step SP6 and after executing the application of each disc, finishes said processing procedure at step SP7.

More specifically, in case of the ordinary compact disc, the reproducing data of the CD reproducing circuit 30 are supplied to the digital analog converter 43, and thus the audio signals are reproduced. On the other hand, in the CD-ROM, the video controllers 36a, 36b and the audio decoder 40 becomes operable and sequentially processed the video data and the audio data.

If the affirmative result is obtained at step SP5, the CPU 33 moves to step SP8 and, after changing the display of the display unit 14 to show the display of the CD-I disc, reads the.

Title of the application software of the disc as label data. The titles are then displayed on the display unit 14 and the CPU 33 move to step SP9.

At this point, the CPU 33 detects the mode of said disc player and examines whether said mode is an automatic mode or not.

More specifically, said disc player 1 has a slide switch (not shown) for setting the mode of disc player 1 on the side of the player 2. The slide switch switches between three switching positions, so that the initialized function mode of said disc player 1 can be set by operating said slide switch.

The mode setting slide switch sets selectively an auto mode, a set-up disc mode or a reset mode.

When the auto mode is set by the slide switch, the affirmative result is obtained in step SP9 and the CPU 33 moves to step SP10 and examines whether the disc 21 is a set-up disc or not, i.e., one of a number of discs which form a unit of application software.

With multiple discs, the identification data for each disc, which shows the type of disc that disc 21 is, is recorded in the disc label with a value of "2" or more while an ordinary disc has identification data recorded with a value of "1".

Referring to the identification data, if the CPU 33 judges that the disc 21 is a set-up disc, the CPU 33 moves to step SP11 and stores the identification data to show that the type of disc is a set-up disc in the memory circuit (not shown) of the system controller 22.

And then, the CPU moves to step SP12 and here executes an application software of the disc 21, then moves to the step SP7 and finishes the processing procedure.

On the other hand, if the negative result is obtained at step SP10, the CPU 33 moves directly to step SP12 and here executes an application software of the disc 21, then moves to step SP7 and finishes the processing procedure.

Thus, in the disc player 1, if the auto mode is set and the disc 21 is a set-up disc, the identification data to show that the type of disc is a set-up disc is set on the system controller 22.

On the other hand, in the case when said disc player 1 is set to a mode other than the auto mode, the CPU 33 obtains the negative result and moves to step SP13, and examines the mode of the slide switch to determine whether the set-up disc mode is selected or not.

When the slide switch is set to the set-up disc mode, the CPU 33 moves to step SP11 and stores the identification data to show that the type of disc is a set-up disc in the memory circuit of the system controller 22, and the moves to step SP12.

Thus, in the case when the disc player 1 is set to the set-up disc mode, even though the disc 21 is not a set-up disc, the identification data will show that the disc is a set-up disc and will be so set in the system controller 22.

On the other hand, in the case when the slide switch is not set to the set-up disc mode, i.e. when it is set on the reset mode, the negative result is obtained at step SP13, and the CPU 33 moves directly to SP12 and then moves to step SP7 and finishes the processing procedure.

Accordingly, in the disc player 1, the identification data that shows the disc type is a set-up disc will be set in the system controller 22, which takes no part in the processing application software, corresponding to the mode set in the disc player 1 and the type of the disc 21.

Construction of the System Controller

The system controller 22 supplies the control data to the spindle servo circuit 24 when the disc 21 is loaded and the operation switch for starting the reproduction is turned ON, and thus rotates the disc 21.

Furthermore, the system controller 22 supplies the control data to the focus tracking servo circuit 27 and the sled servo circuit 28 when the rotating speed of said disc 21 comes to the regular speed, and then starts the reproduction of said disc 21 from the lead-in area of the disc 21.

With this arrangement, the system controller 22 starts the function mode of the disc player 1 to the reproducing mode, and sequentially supplies the video data and the audio data recorded in the disc 21 to the bus 35.

At this point, when the identification data is obtained from the CPU 33, the system controller 22 stores said identification data in the built-in memory circuit, and thus sets the function mode.

Figure 4:
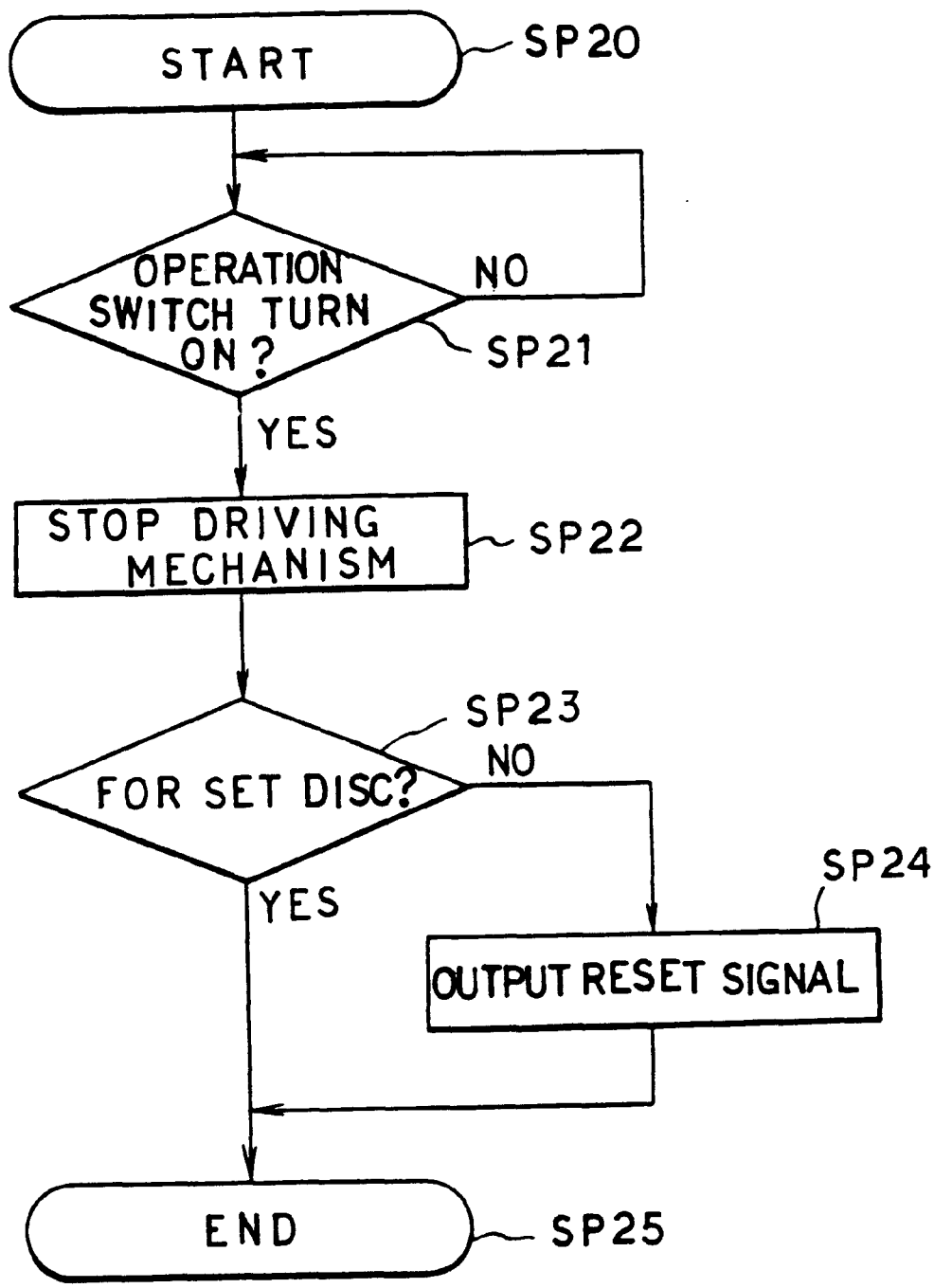
FIG. 4 is a flow chart showing the processing procedure of the system controller.

When the eject switch 6 is pressed, the system controller 22 executes the processing procedure as shown in FIG. 4, and thus the function of said disc player 1 is stopped according to the type of the disc 21.

More specifically, the system controller 22 moves from step SP20 to step SP21, and thereby examines whether the eject switch 6 is turned ON or not, and if the negative result is obtained, repeats step SP21.

On the other hand, in the case when the eject switch 6 is turned ON, the positive result will be obtained at step SP21, and the system controller 22 moves to step SP22 and stops the driving system.

More specifically, the system controller 22 supplies the control data to the spindle servo circuit 24, the focus tracking servo circuit 27 and the sled servo circuit 28, and stops the reproduction of the disc 21.

Furthermore, when the disc 21 stops its rotation, the system controller 22 supplies the control signal to the prescribed locking system, and thereby removes the locking system of the inside cover 7 and thus the disc 21 can be taken out.

Furthermore, the system controller 22 moves to step SP23 and by accessing the built-in memory circuit, examines whether the disc is a set-up disc or not.

At this point, if the disc is not a set-up disc, the system controller 22 moves to step SP24 and supplies the control data to the reset signal generating circuit 50.

The reset signal generating circuit 50 forms the prescribed reset signal RST corresponding to said control data and supplies said reset signal RST to the video controllers 36a and 36b.

With this arrangement, the video controllers 36a and 36b return to the initial states corresponding to said reset signal RST.

Furthermore, the video controller 36a transmits the reset signal RST to the CPU 33 corresponding to said reset signal RST, and after returning to the initial state corresponding to said rest signal RST, the CPU 33 resets the audio decoder 40.

Thus, the CPU 33, the video controllers 36a and 36b, and the audio decoder 40 can be reset corresponding to the pressing operation of the eject switch 6 on the inside cover 7, the complicated reset switch operation can be omitted.

After the completion of said reset function, the system controller 22 moves to step SP25 and finishes the processing procedure.

On the other hand, in the case when the disc is a set-up disc or when the disc player 1 is set on the mode for a set-up disc, the system controller 22 moves directly to step SP25 and finishes the processing procedure.

Thus, in the case if the disc 21 is the set-up disc or if the user desires, the application of the disc 21 to be subsequently set, can be executed by omitting the reset function.

With this arrangement, if the operation of the reset switch is omitted, it can be set only when necessary, and accordingly, the usability of the disc player 1 can be improved.

Function of the Embodiment

According to the foregoing construction, when the reproduction of the disc starts, in the disc player 1, the TOC data are read to the CPU 33.

With this arrangement, in case of the auto mode, the disc player 1 stores the identification data in the system controller 22 according to the descramble identification data.

Furthermore, in case of other than the auto mode and the set-up disc mode, the storage of the identification data is not done while the discrimination data is stored in the system controller 22 in case of the set-up disc mode.

With this arrangement, if the eject switch 6 is pressed, the system controller 22 stops the operation of the driving system and it starts the reset function according to the identification data, and thus can reset as occasion calls by omitting the complicated operation of the reset switch.

Effect of the Embodiments

According to the foregoing construction, by controlling the reset signal in response to the TOC data, in accordance with the function mode of said disc player 1, the reset function can be executed as necessary.

Other Embodiments.

The embodiments discussed above has dealt with the case of the changing the modes by operating the slide switch placed on the side of the player 2. However, the preset invention is not limited to the above, but also it may be set by operating the X-Y device switch 11 when displaying the initial picture.

Moreover, the embodiment discussed above has dealt with the case of resetting according to the disc label in case of the automatic mode. However, the present invention is not limited to the above, but also it may be arranged to set always in case of the exclusive disc player for not reproducing the set-up disc, or it may be rest according to the setting of the slide switch ignoring the identification data of the disc label, and further, it may be reset in accordance with the identification data of the disc label by omitting the slide switch.

Furthermore, the embodiment discussed above has dealt with the case of resetting the CPU 33, the audio decoder 40 via the video controller. However, the present invention is not limited to the above, but also widely applicable to the various reset methods in case of resetting the video controller and the audio decoder via the CPU 33.

Moreover, the embodiment discussed above has dealt with the case of operating the eject switch 6 and enabling to take out the disc by removing the locking mechanism of the inside cover. However, the present invention is not limited to the above, but is also widely applicable to the case, such as, taking out the disc by moving the tray.

Furthermore, the embodiment discussed above has dealt with the case of reproducing the ordinary compact discs in addition to the CD-I disc. However, the present invention is not limited to the above, but also it may be applied to the disc players exclusively for CD-I discs.

According to the present invention as discussed above, the complicated operation of the reset switch can be omitted and can reset with certainty only when necessary corresponding to the operation of the eject switch for taking out discs and by resetting the video data processing circuit.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A disc player for reproducing a disc on which image information and audio information are recorded, the disc player comprising:

disc ejecting means for ejecting the disc from the disc player;

drive means for rotating the disc;

disc drive control means for stopping the drive means of the disc in response to the disc ejecting means;

signal processing means for processing the audio information and the image information reproduced from the disc; and reset means for initializing the signal processing means in response to the disc ejecting means ejecting the disc.

2. The disc player as cited in claim 1, and further comprising memory means for storing identification information indicating disc mode, and wherein operation of the reset means is inhibited when the identification information indicates a set-disc mode.

3. The disc player as cited in claim 2, wherein the identification information to be stored in the memory means is obtained from a lead-in area of the disc.

4. The disc player as cited in claim 2, and further comprising switch means which selects an auto mode position where the memory means stores the disc mode obtained from a lead-in area of the disc, a set-disc mode position where the memory means stores the set-disc mode regardless of the disc mode obtained from the lead-in area of the disc, and a reset mode position where no data is stored in the memory means.

5. The disc player as cited in claim 1, and further comprising central control means for controlling the signal processing means, the central control means having an automatic mode, an initialization mode, and a play mode, wherein when in the automatic mode, the central control means initializes the signal processing means if a first type of disc is present, and executes an application if a second type of disc is present, wherein when in the initialization mode, the central control means initializes the signal processing means, and wherein when in the play mode, the central control means executes the application.

6. A disc player for reproducing a disc on which image information and audio information are recorded, the disc player comprising:

a disc ejector that ejects the disc from the disc player;

a driver that rotates the disc;

a disc drive controller that stops the driver in response to the disc ejector;

a signal processor that processes the audio information and the image information reproduced from the disc; and a reset circuit that initializes the signal processor in response to the disc ejector ejecting the disc.

7. The disc player as cited in claim 6, and further comprising a memory that stores identification information indicating disc mode, and wherein operation of the reset circuit is inhibited when the identification information indicates a set-disc mode.

8. The disc player as cited in claim 7, wherein the identification information to be stored in the memory is obtained from a lead-in area of the disc.

9. The disc player as cited in claim 7, and further comprising a switch that selects an auto mode position where the memory stores the disc mode obtained from a lead-in area of the disc, a set-disc mode position where the memory stores the set-disc mode regardless of the disc mode obtained from the lead-in area of the disc, and a reset mode position where no data is stored in the memory.

10. The disc player as cited in claim 6, and further comprising a central controller that controls the signal processor, the central controller having an automatic mode, an initialization mode, and a play mode, wherein when in the automatic mode, the central controller initializes the signal processor if a first type of disc is present, and executes an application if a second type of disc is present, wherein when in the initialization mode, the central controller initializes the signal processor, and wherein when in the play mode, the central controller executes the application.

\* \* \* \* \*